(12) United States Patent
Banerjee (10) Patent No.: US 9,300,691 B1
(45) Date of Patent: Mar. 29, 2016

(54) SYSTEMS AND METHODS FOR ENFORCING SECURE NETWORK SEGMENTATION FOR SENSITIVE WORKLOADS

(71) Applicant: Symantec Corporation, Mountain View, CA (US)

(72) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 182 days.

(21) Appl. No.: 13/945,373

(22) Filed: Jul. 18, 2013

(51) Int. Cl.
*H04L 29/06* (2006.01)

(52) U.S. Cl.
CPC ...................................... *H04L 63/20* (2013.01)

(58) Field of Classification Search
CPC ....................................................... H04L 63/20
See application file for complete search history.

(56) References Cited

U.S. PATENT DOCUMENTS

| | | | | |
|---|---|---|---|---|
| 2002/0141343 A1* | 10/2002 | Bays | ................... | H04L 41/0893 370/235 |
| 2006/0126619 A1* | 6/2006 | Teisberg | ........... | H04L 29/12009 370/389 |
| 2011/0010339 A1* | 1/2011 | Wipfel | .............. | G06F 17/30067 707/610 |
| 2012/0093156 A1* | 4/2012 | Budhani | ................. | H04L 12/56 370/392 |
| 2012/0096512 A1* | 4/2012 | Zallocco | ............... | H04L 63/164 726/1 |
| 2012/0159572 A1* | 6/2012 | Patel | ..................... | H04L 63/102 726/3 |
| 2012/0185913 A1* | 7/2012 | Martinez | ................. | G06F 9/455 726/1 |

* cited by examiner

*Primary Examiner* — Ellen Tran
*Assistant Examiner* — Wasika Nipa
(74) *Attorney, Agent, or Firm* — ALG Intellectual Property, LLC (57) ABSTRACT

A computer-implemented method for enforcing secure network segmentation for sensitive workloads may include (1) identifying a sensitive workload that is deployed within a subnet of a segmented network on a remote workload hosting platform, (2) identifying a security policy that applies to the sensitive workload, wherein a deployment of the sensitive workload within the subnet of the segmented network complies with the security policy, (3) intercepting, at a proxy, an attempt to reconfigure the deployment of the sensitive workload within the segmented network on the remote workload hosting platform, (4) determining that the attempt to reconfigure the deployment of the sensitive workload could result in a violation of the security policy, and (5) enforcing, on the proxy, the security policy on the attempt to reconfigure the deployment of the sensitive workload. Various other methods, systems, and computer-readable media are also disclosed.

20 Claims, 7 Drawing Sheets

FIG. 7

SYSTEMS AND METHODS FOR ENFORCING SECURE NETWORK SEGMENTATION FOR SENSITIVE WORKLOADS

BACKGROUND

Third-party remote hosting platforms, sometimes referred to as cloud computing platforms or simply as "the cloud," are becoming increasingly popular for both personal and enterprise users. The cloud may host everything from documents to websites to complicated network architecture. Using cloud computing platforms may have many benefits, including flexibility, reliability, scalability and accessibility. However, every computing platform has its challenges, and the cloud is no exception. Concerns about security, privacy, and confidentiality are an even higher priority on third-party hosting solutions like the cloud than on private networks.

Traditional systems for security on the cloud may focus mainly on securing systems and data against external attackers and may rely on techniques such as encryption. However, such systems do nothing to stop internal actors from committing security breaches, either accidentally or maliciously. Traditional systems may offer some form of network segmentation and/or segregation of duties, but may not have any means of ensuring the network segmentation complies with existing security policies. Accordingly, the instant disclosure identifies and addresses a need for additional and improved systems and methods for enforcing secure network segmentation for sensitive workloads.

SUMMARY

As will be described in greater detail below, the instant disclosure generally relates to systems and methods for enforcing secure network segmentation for sensitive workloads by identifying sensitive workloads on a cloud hosting platform, creating a security policy that defines the network segmentation for the sensitive workloads, and enforcing the security policy by routing all configuration changes to the sensitive workloads through a proxy that may block configuration changes that violate the security policy.

In one example, a computer-implemented method for enforcing secure network segmentation for sensitive workloads may include (1) identifying a sensitive workload that is deployed within a subnet of a segmented network on a remote workload hosting platform, (2) identifying a security policy that applies to the sensitive workload (where a deployment of the sensitive workload within the subnet of the segmented network complies with the security policy), (3) intercepting, at a proxy, an attempt to reconfigure the deployment of the sensitive workload within the segmented network on the remote workload hosting platform, (4) determining that the attempt to reconfigure the deployment of the sensitive workload could result in a violation of the security policy, and (5) enforcing, on the proxy, the security policy on the attempt to reconfigure the deployment of the sensitive workload.

The attempt to reconfigure the deployment of the sensitive workload may include any or all of a number of types of policy changes. In some examples, the change may involve the relationship between the subnet and an additional subnet. In one example, the attempt to reconfigure the deployment of the sensitive workload may include an attempt to allow data within the sensitive workload to be sent from the subnet to an additional subnet within the segmented network. Additionally or alternatively, the attempt to reconfigure the deployment of the sensitive workload may include an attempt to change a relationship between the subnet and an additional subnet within the segmented network. In this example, the relationship may comply with the security policy, and the change to the relationship may allow the violation of the security policy. Additionally or alternatively, the attempt reconfigure the deployment of the sensitive workload may include an attempt to move the sensitive workload from the subnet to an additional subnet within the segmented network.

In some examples, the attempt to reconfigure the deployment of the sensitive workload may not involve an additional subnet. In one example, the attempt to reconfigure the deployment of the sensitive workload may include an attempt to allow a user access to the sensitive workload. In this example, the violation of the security policy may be the user accessing the sensitive workload.

Additionally or alternatively, the attempt to reconfigure the deployment of the sensitive workload may include an attempt to allow data within the sensitive workload to be sent from the subnet to an external network that is not within the segmented network.

In some examples, identifying the sensitive workload that is deployed on the subnet may include identifying a type of the sensitive workload and tagging the sensitive workload with the type.

In one embodiment, the security policy that applies to the sensitive workload may be based at least in part on at least one of (1) an owner of the sensitive workload, (2) a type of the sensitive workload, (3) a tier of the sensitive workload, (4) the subnet on which the sensitive workload is deployed, and/or (5) a type of data stored by the sensitive workload.

In some examples, enforcing the security policy on the attempt to reconfigure the deployment of the sensitive workload may include blocking the attempt.

In one embodiment, a system for implementing the above-described method may include (1) a workload identification module that identifies a sensitive workload that is deployed within a subnet of a segmented network on a remote workload hosting platform, (2) a policy identification module that identifies a security policy that applies to the sensitive workload (where a deployment of the sensitive workload within the subnet of the segmented network complies with the security policy), (3) an interception module that intercepts, at a proxy, an attempt to reconfigure the deployment of the sensitive workload within the segmented network on the remote workload hosting platform, (4) a determination module that determines that the attempt to reconfigure the deployment of the sensitive workload could result in a violation of the security policy, (5) an enforcement module that enforces, on the proxy, the security policy on the attempt to reconfigure the deployment of the sensitive workload, and (6) at least one processor configured to execute the workload identification module, the policy identification module, the interception module, the determination module, and the enforcement module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a sensitive workload that is deployed within a subnet of a segmented network on a remote workload hosting platform, (2) identify a security policy that applies to the sensitive workload (where a deployment of the sensitive workload within the subnet of the segmented network complies with the security policy), (3) intercept, at a proxy, an attempt to reconfigure the deployment of the sensitive workload within the segmented network on the remote workload hosting platform, (4) determine that the attempt to reconfigure the deployment of the sensitive workload could result in a violation of the security policy, and (5) enforce, on the proxy, the security policy on the attempt to reconfigure the deployment of the sensitive workload.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for enforcing secure network segmentation for sensitive workloads. As will be explained in greater detail below, determining a security policy for sensitive workloads on segmented networks and enforcing the security policy at a proxy may prevent configuration changes that could result in security policy violations that result in data breaches. Ensuring that the security policy is enforced may improve the security and confidentiality of sensitive workloads and/or data hosted on cloud computing platforms.

The following will provide, with reference to FIGS. 1-2, 4 and 5, detailed descriptions of exemplary systems for enforcing secure network segmentation for sensitive workloads. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
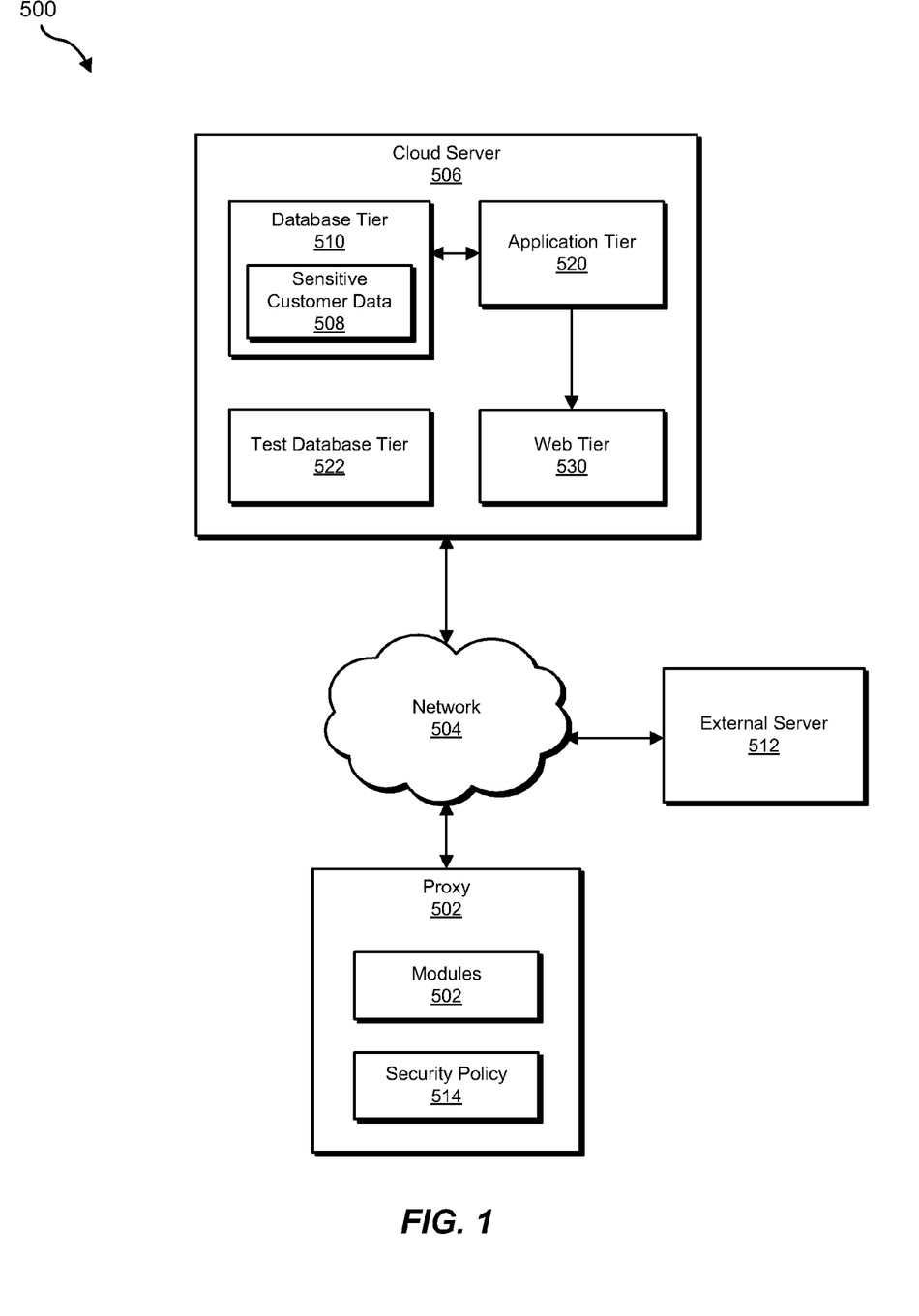
FIG. 1 is a block diagram of an exemplary system for enforcing secure network segmentation for sensitive workloads.

FIG. 1 is a block diagram of exemplary system 100 for enforcing secure network segmentation for sensitive workloads. As illustrated in this figure, exemplary system 100 may include one or more modules 102 for performing one or more tasks. For example, and as will be explained in greater detail below, exemplary system 100 may include a workload identification module 104 that may identify a sensitive workload that may be deployed within a subnet of a segmented network on a remote workload hosting platform. Exemplary system 100 may also include a policy identification module 106 that may identify a security policy that applies to the sensitive workload. A deployment of the sensitive workload within the subnet of the segmented network may comply with the security policy.

Exemplary system 100 may additionally include an interception module 108 that may intercept, at a proxy, an attempt to reconfigure the deployment of the sensitive workload within the segmented network on the remote workload hosting platform. Exemplary system 100 may also include a determination module 110 that may determine that the attempt to reconfigure the deployment of the sensitive workload could result in a violation of the security policy. Exemplary system 100 may additionally include an enforcement module 112 that may enforce, on the proxy, the security policy on the attempt to reconfigure the deployment of the sensitive workload. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
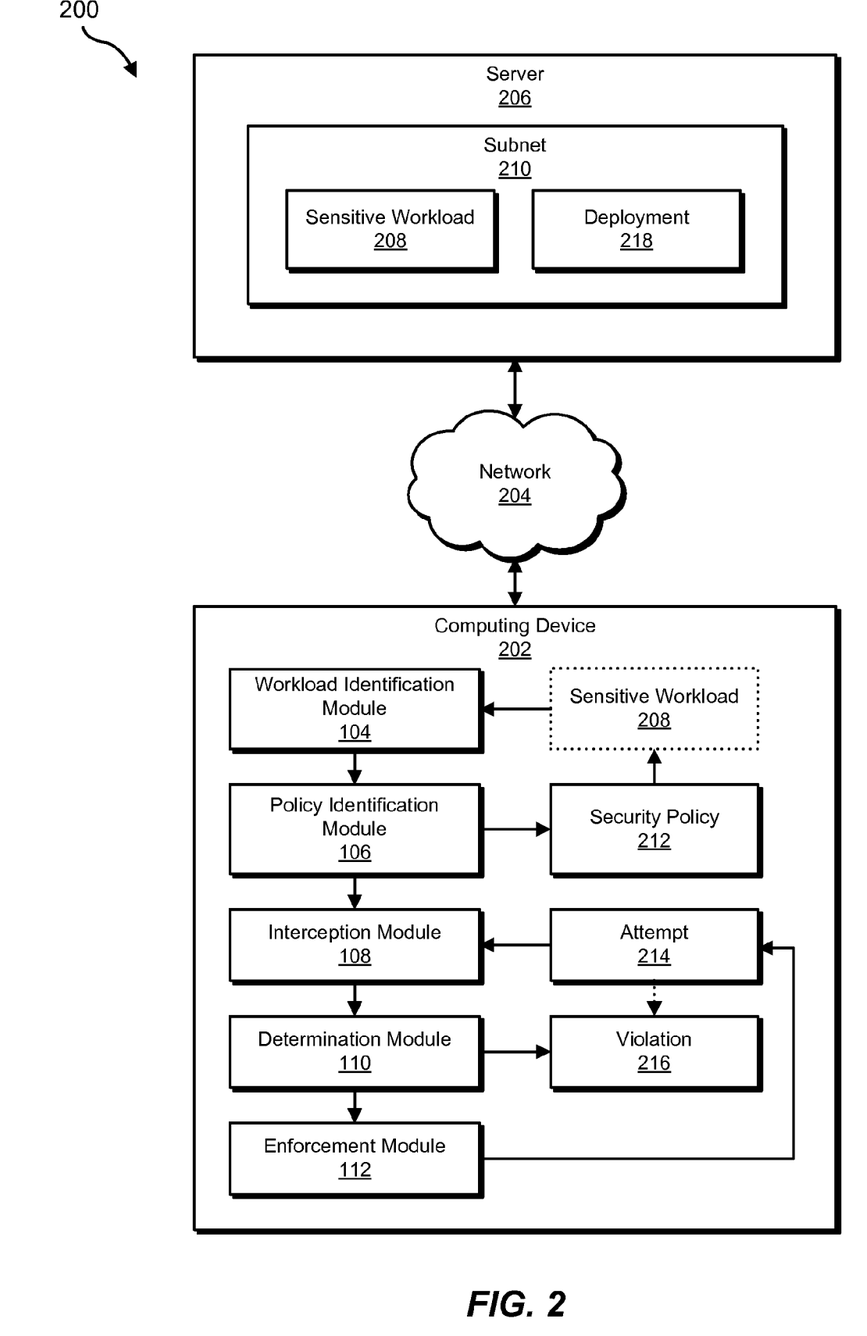
FIG. 2 is a block diagram of an exemplary system for enforcing secure network segmentation for sensitive workloads.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, facilitate computing device 202 and/or server 206 in enforcing secure network segmentation for sensitive workloads. For example, and as will be described in greater detail below, one or more of modules 102 may cause computing device 202 and/or server 206 to enforce secure network segmentation for sensitive workloads. For example, and as will be described in greater detail below, workload identification module 104 may be programmed to identify a sensitive workload 208 that is deployed within a subnet 210 of network 204 on server 206. Policy identification module 106 may be programmed to identify a security policy 212 that applies to sensitive workload 208. A deployment 218 of sensitive workload 208 within subnet 210 of network 204 may comply with security policy 212. Interception module 108 may be programmed to intercept, at a computing device 202, an attempt 214 to reconfigure deployment 218 of sensitive workload 208 within network 204 on server 206. Determination module 110 may be programmed to determine that attempt 214 to reconfigure deployment 218 of sensitive workload 208 could result in a violation 216 of security policy 212. Enforcement module 112 may be programmed to enforce, on computing device 202, security policy 212 on attempt 214 to reconfigure deployment 218 of sensitive workload 208.

Computing device 202 generally represents any type or form of computing device capable of reading computer-executable instructions. Examples of computing device 202 include, without limitation, proxy servers, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of hosting subnets. Examples of server 206 include, without limitation, remote workload hosting platforms, application servers, and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
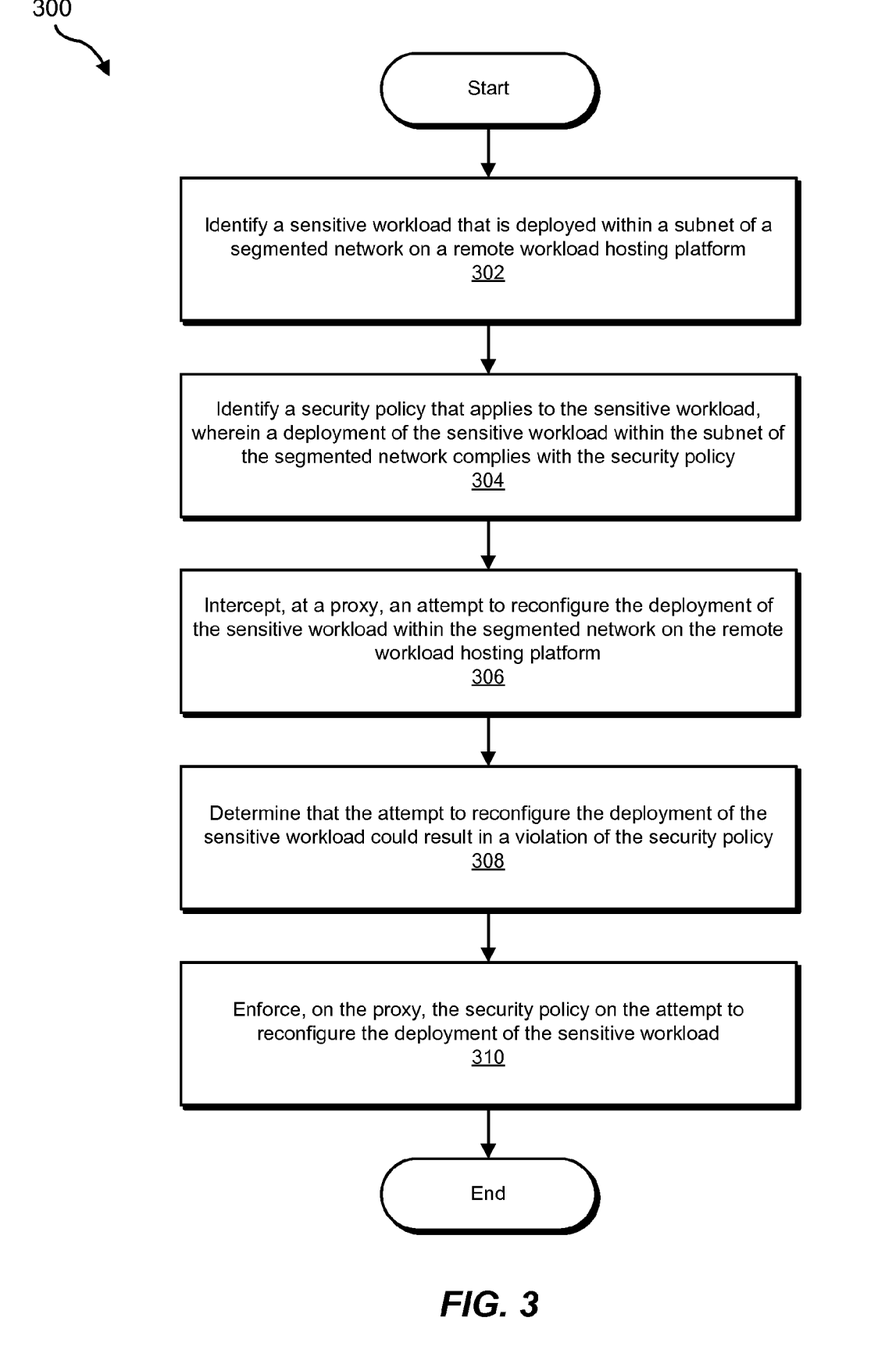
FIG. 3 is a flow diagram of an exemplary method for enforcing secure network segmentation for sensitive workloads.

FIG. 3 is a flow diagram of an exemplary computer-implemented method 300 for enforcing secure network segmentation for sensitive workloads. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a sensitive workload that is deployed within a subnet of a segmented network on a remote workload hosting platform. For example, at step 302 workload identification module 104 may, as part of computing device 202 in FIG. 2, identify sensitive workload 208 that is deployed within subnet 210 of network 204 on server 206.

Identification module 104 may identify the sensitive workload in a variety of locations. In some embodiments, workload identification module 104 may identify a sensitive workload that is hosted on a specific network segment within a cloud computing platform. For example, workload identification module 104 may identify a database tier application that is hosted on the database tier of an AMAZON WEB SERVICES (AWS) cloud server.

As used herein, the term "workload" may refer to any job, task, and/or application that may be hosted by and/or executed within a virtual data center. For example, a virtual data center may provision a workload with one or more virtualized resources. As used herein, the phrase "virtual data center" may refer to any system for virtualizing computing resources (e.g., processing, storage, and/or network resources), such as a cloud computing platform. In some examples, a virtual data center may provide a common computing infrastructure. As used herein, the phrase "common computing infrastructure" may refer to any set of computing resources underlying the virtualized resources provided by a virtual data center. For example, the common computing infrastructure may include one or more hypervisors, storage devices, and/or networking devices. In some examples, one or more rules may specify the environment in which a workload is to operate (e.g., requiring specific underlying hardware configurations, requiring containment to specified geographical regions, etc.). Additionally or alternatively, one or more rules may specify minimum resource, performance, and/or reliability requirements for a workload.

The phrase "sensitive workload," as used herein, generally refers to any workload that may store, access, and/or handle sensitive data. The phrase "sensitive data," as used herein, may refer to any type of data that may cause harm if made publicly available. Examples of sensitive data include, without limitation, customer data, personally identifying information, company confidential data, financial information, credit card data, and/or classified data. For example, an AMAZON ELASTIC BLOCK STORE volume including customer information may include a sensitive workload.

The term "subnet," as used herein, may refer to any network segment within a segmented network. In some embodiments, a subnet may be a logical division of a network (e.g. may host a certain type of application and/or data). A subnet may be a portion of a segmented network that may have controls on data that can be sent and/or received from or by that portion of the segmented network and that are distinct from controls on data for other subnets within the segmented network. For example, any two subnets within a segmented network may be separated by one or more firewalls. Additionally or alternatively, a first subnet may be subject to a security group policy, a data loss prevention policy, and/or a network access control list and a second subnet may be subject to other policies and/or lists. In one example, a subnet may include a database tier that may be subject to a policy restricting the subnet from receiving requests from external networks.

The phrase "remote workload hosting platform," as used herein, may be used interchangeably with "cloud computing platform" and/or "the cloud" and generally refers to any networked computing platform capable of hosting workloads, data, and/or documents. A remote workload hosting platform may include a plurality of distributed computing devices connected via a network that may be used for application service provisioning. A remote workload hosting platform may be private (e.g. may host applications and/or data belonging to a single organization) and/or public (e.g. may be operated over a network that is open for public use). Examples of remote workload hosting platforms may include AMAZON WEB SERVICES, GOOGLE CLOUD, MICROSOFT CLOUD SERVICES, and/or HEROKU.

In some examples, workload identification module 104 may identify a sensitive workload that is deployed on a subnet by identifying a type of the sensitive workload and tagging the sensitive workload with information indicative of the type. The type of a sensitive workload may be defined by and/or based on a type of data contained within a sensitive workload. Examples of types of data stored within sensitive workloads may include customer credit card information, confidential company strategy information, and/or personally identifying information.

The type of a sensitive workload may also to be based on a data loss prevention policy directed to the type of data stored within the sensitive workload. Such data loss prevention policies may define any type of rule or restriction for data within sensitive workloads. Examples of such data loss prevention policy rules may include rules that prohibit customer data from being accessible to external servers, rules that prohibit confidential information from being accessible to a particular web tier, and/or rules that define that personally identifying information must be stored in a particular database.

At step 304 one or more of the systems described herein may identify a security policy that applies to the sensitive workload (where a deployment of the sensitive workload within the subnet of the segmented network complies with the security policy). For example, at step 304 policy identification module 106 may, as part of computing device 202 in FIG. 2, identify security policy 212 that applies to sensitive workload 208. Deployment 218 of sensitive workload 208 within subnet 210 of network 204 may comply with security policy 212.

Policy identification module 106 may identify a security policy in a variety of contexts. For example, policy identification module 106 may identify a cloud computing security policy that applies to the sensitive workload. In some examples, policy identification module 106 may generate the security policy based on the nature of the sensitive workload and/or sensitive data stored by the sensitive workload. For example, policy identification module 106 may determine how workloads may communicate within a segmented network based on the role filled by each workload and/or based on the types of data stored by each workload. The systems and methods presented herein may determine that a current deployment of the sensitive workload on the subnet of the cloud computing platform may comply with the security policy.

In one example, policy identification module 106 may identify a cloud data security policy that applies to a database tier application. A current deployment and/or configuration of the database tier application, which may be on an AWS network segment, may comply with the cloud data security policy. In this example, the cloud data security policy may include rules such as "data from the database tier may not be accessible by the web tier," "the database tier may not be accessible by external networks," and/or "all secure databases must be located on the database tier." The current deployment of the database tier may conform to any or all of these rules.

A security policy identified by policy identification module 106 may be enforced based on a variety of factors. For example, a security policy may be enforced based on an owner of the sensitive workload (e.g., an AWS Identity and Access Management owner) and/or a type of the sensitive workload (e.g., whether the workload includes database, an application, a test database, and/or a test application).

Additionally or alternatively, the security policy may be based on a tier of the sensitive workload (e.g., a web tier where the sensitive workload is located, an application tier where the sensitive workload is located, a database tier where the sensitive workload is located, etc.) and/or one or more subnets on which the sensitive workload is deployed (e.g., the sensitive workload may be spread over multiple subnets and/or across multiple tiers). As another example, the security policy may be based on a type of data stored by the sensitive workload (e.g., a sensitive workload may store customer data, confidential data, and/or personally identifying information, etc.). The security policy may also be implemented in view of or otherwise based on any other suitable factor.

Figure 5:
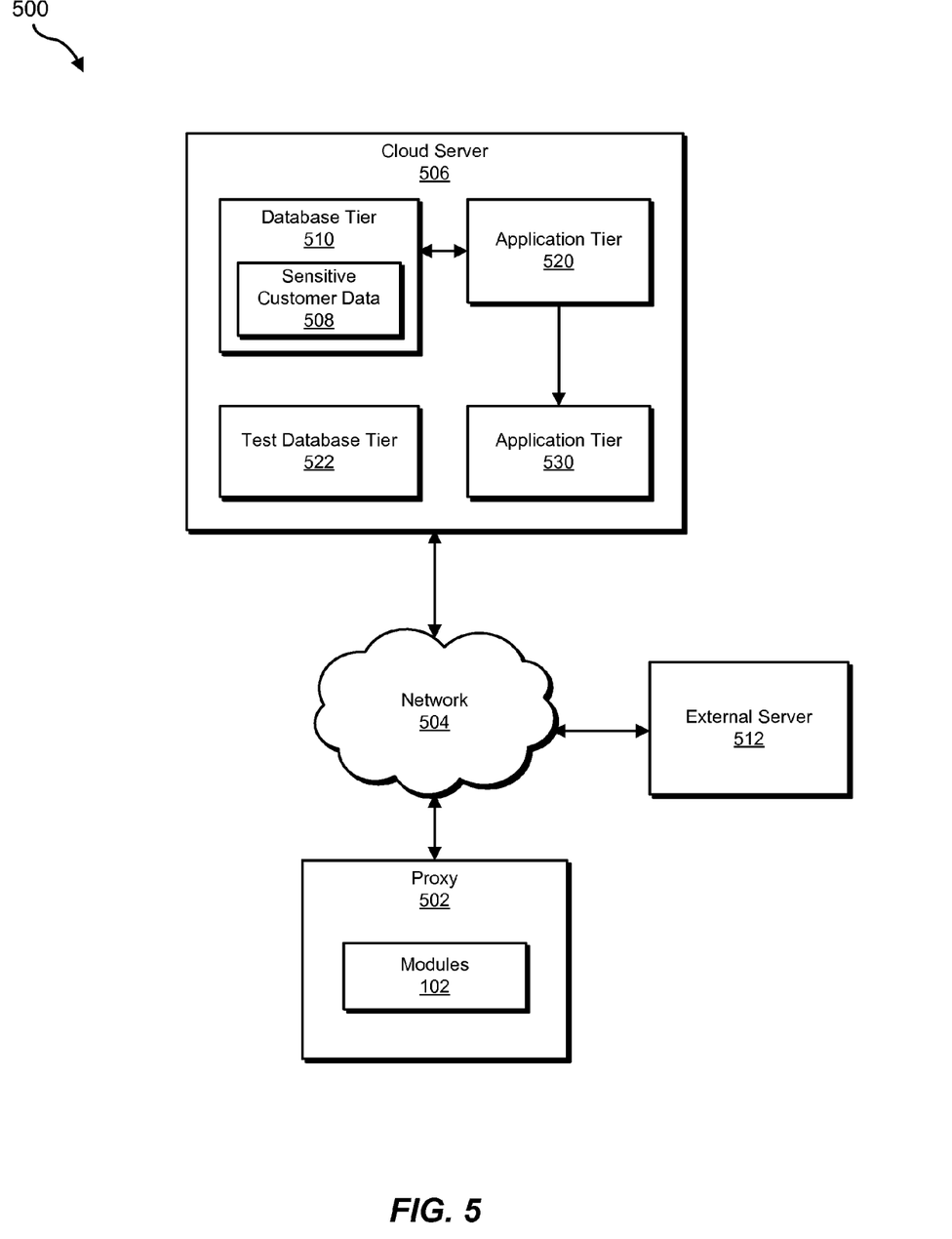
FIG. 5 is a block diagram of an exemplary system for enforcing secure network segmentation for sensitive workloads.

Policy identification module 106 may identify many different types of security policies, depending on the deployment of the sensitive workload. Sensitive workloads may be deployed in any number of ways on a segmented network on a remote workload hosting platform. A security policy may include a number of different rules governing the configuration of, access to, and/or traffic between subnets on a segmented network. FIG. 5 illustrates an exemplary tier system on a segmented network. FIG. 5 is a block diagram of an exemplary computing system 400 for enforcing secure network segmentation for sensitive workloads. Cloud server 506 may include database tier 510, application tier 520, web tier 530, and/or test database tier 522. Database tier 410 may include sensitive customer data 508. Cloud server 506 may be connected to proxy 502 and/or external server 512 via network 504. Proxy 502 may include modules 102 and/or security policy 514.

Security policy 514 may include any number of rules for the deployment of network segments within cloud server 506. For example, security policy 514 may specify that database tier 510 may communicate directly with application tier 520 but not with web tier 530. Web tier 530 may only be allowed to communicate directly with application tier 520. Security policy 514 may also specify that test database tier 522 may be accessed by external server 512, but that database tier 510 may not be accessed by external server 512. Database tier 510 may not be accessed by external server 512 because security policy 514 may include a rule that customer data may not be accessible to external servers, and database tier 510 may include sensitive customer data 508.

Returning to FIG. 3, at step 306 one or more of the systems described herein may intercept, at a proxy, an attempt to reconfigure the deployment of the sensitive workload within the segmented network on the remote workload hosting platform. For example, at step 306 interception module 108 may, as part of computing device 202 in FIG. 2, intercept, at a proxy, attempt 214 to reconfigure deployment 218 of sensitive workload 208 within network 204 on server 206.

Interception module 108 may intercept any of a variety of types of attempts to make various types of configuration changes. For example, interception module 108 may intercept an attempt to make a configuration change to the deployment of the sensitive workload within the network segment on the cloud computing platform. In one example, interception module 108 may intercept an attempt to reconfigure the database tier application to accept requests from a server external to the AWS platform. In other examples, interception module 108 may intercept requests to change relationships between subnets, allow data to be moved between subnets, and/or move workloads between subnets.

The term "proxy," as used herein, may refer to any computing system that acts as an intermediary between at least two other computing systems. For example, a proxy may act as an intermediary between a server and a client. In one embodiment, interception module 108 may be hosted on a proxy server which acts as an intermediary between the segmented network and any computing system not part of the segmented network. In this example, requests directed to reconfiguring the segmented network and/or the deployment of workloads on the segmented network may be required to pass through the proxy.

At step 308 one or more of the systems described herein may determine that the attempt to reconfigure the deployment of the sensitive workload could result in a violation of the security policy. For example, at step 308 determination module 110 may, as part of computing device 202 in FIG. 2, determine that attempt 214 to reconfigure deployment 218 of sensitive workload 208 could result in a violation 216 of security policy 212.

Determination module 110 may determine that a configuration change could result in a security policy violation in any of a number of ways depending on the current configuration of the segmented network. For example, determination module 110 may determine that the attempt to make a configuration change to the deployment of the sensitive workload could result in a violation of a cloud computing security policy. As another example, determination module 110 may determine that allowing an external server to communicate with the database tier application may cause a violation of the data security policy rule that states that sensitive data may not be sent to external servers.

Determination module 110 may account for any number of potential security policy violations that could result from a reconfiguration of the deployment of the sensitive workload. The reconfiguration of the deployment of the sensitive workload may include a change in the configuration of the segmented network (e.g., including how two or more subnets may communicate). Additionally or alternatively, the reconfiguration of the deployment of the workload may include a change in the placement of the sensitive workload within the segmented network.

Figure 4:
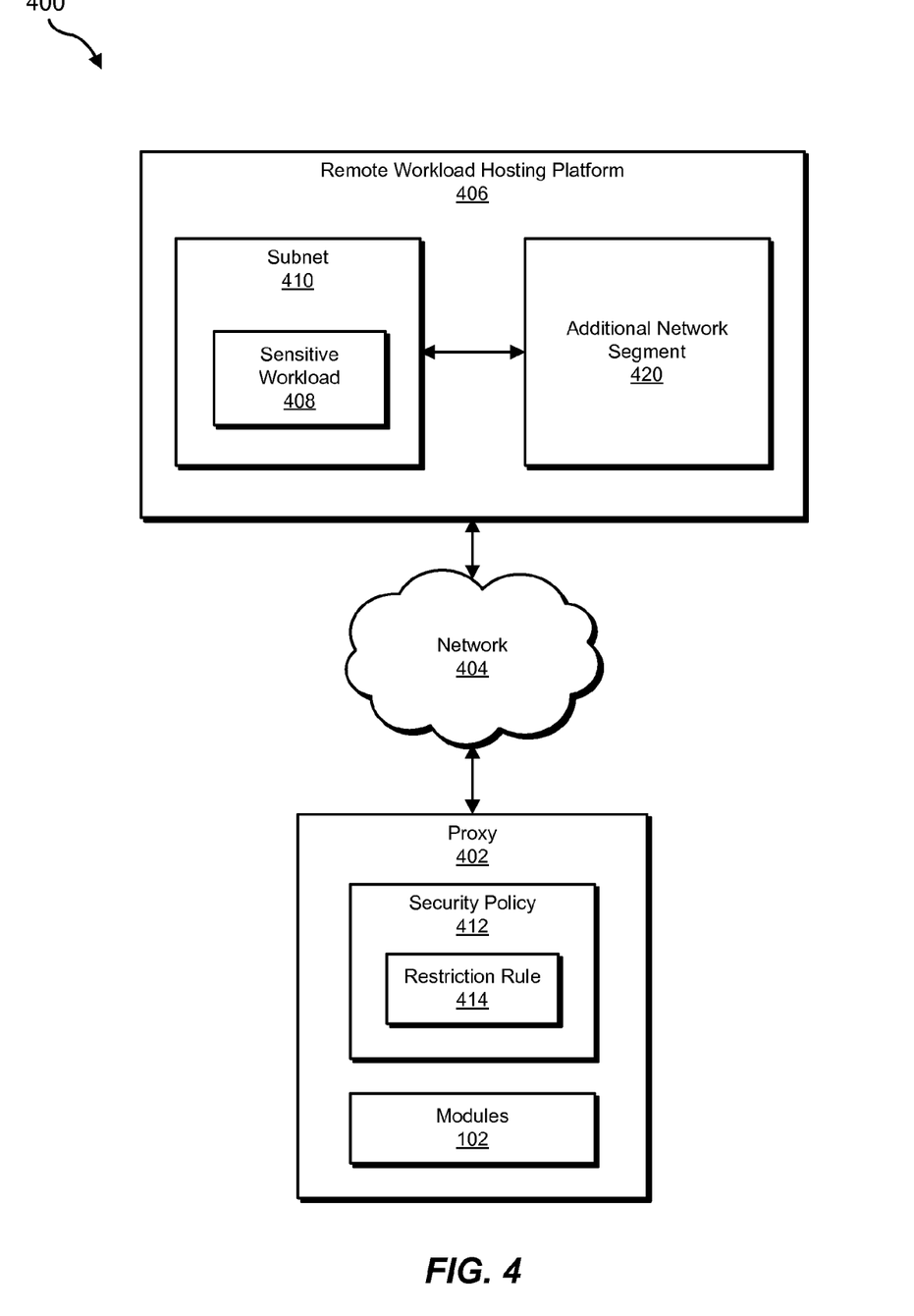
FIG. 4 is a block diagram of an exemplary system for enforcing secure network segmentation for sensitive workloads.

In some examples, potential security violations may involve attempts to reconfigure a sensitive workload to include an additional subnet. Such violations may occur in environments such as those shown in FIG. 4. As shown in FIG. 4, remote workload hosting platform 406 may include subnet 410 and/or additional subnet 420. Subnet 410 may include sensitive workload 408. Remote workload hosting platform 406 may be connected to proxy 402 by network 404. Proxy 102 may include modules 102 and or security policy 412. Security policy 412 may include restriction rule 414.

In one example, the attempt to reconfigure the deployment of the sensitive workload may include an attempt to allow data within the sensitive workload to be sent from the subnet to an additional subnet within the segmented network. For example, the attempt may include an attempt to allow data from sensitive workload 408 to be sent from subnet 410 to additional subnet 420. Subnet 410 may include a database tier that may be protected from external access by a security group policy, while additional subnet 420 may not be protected by a security group policy. Restriction rule 414 of security policy 412 may state that data within sensitive workload 408 must not be accessed by external servers. In this example, sending data from sensitive workload 408 to subnet 420 may cause a violation of restriction rule 414. In one example, sensitive workload 408 may include an instance of MICROSOFT SHAREPOINT that may include internal company documents and may not be accessed by external servers, and subnet 420 may be an externally facing portal that may be accessible by external servers.

Additionally or alternatively, the attempt to reconfigure the deployment of the sensitive workload may include an attempt to change a security-compliant relationship between a subnet and an additional subnet in a manner that results in a manner that does not comply with one or more security policies. For example, the attempt may include an attempt to allow data to be sent from subnet 410 to additional subnet 420. In this example, subnet 410 may include a database and/or subnet 420 may include a web tier, and restriction rule 414 may disallow data from being sent directly from the database tier to the web tier. As a result, changing the relationship between subnet 410 and subnet 420 to allow such data transfers may violate restriction rule 414.

In some embodiments, the attempt reconfigure the deployment of the sensitive workload may include an attempt to move the sensitive workload from a subnet to an additional subnet within a segmented network. For example, a reconfiguration attempt may include an attempt to move sensitive workload 408 from subnet 410 to additional subnet 420. In this example, restriction rule 414 of security policy 412 may state that access to data within sensitive workload 108 should be limited to an approved list of users, and moving sensitive workload 408 to subnet 420 may cause a violation of restriction rule 414 if subnet 420 may be accessed by users who are not on the approved list.

In some examples, the attempt to reconfigure the deployment may not involve an alternate subnet. Instead, the attempt to reconfigure the deployment of the sensitive workload may involve an attempt to allow a user access to the sensitive workload, and the security policy may indicate that the user should not be allowed to access the sensitive workload. For example, the security policy rule may indicate that a sensitive workload should only be accessible to users with administrator privileges. If the attempt to reconfigure the deployment of the sensitive workload involves an attempt to allow users without administrative privileges to access the sensitive workload, the reconfiguration attempt may trigger a violation of the security policy.

In one example, the attempt to reconfigure the deployment of the sensitive workload may include an attempt to allow data within the sensitive workload to be sent from a subnet within a segmented network to an external network that is not within the segmented network. For example, the sensitive workload may include a database with customer information that may be governed by a security policy that prevents customer information from leaving the segmented network. In this example, the sensitive workload may be configured to prevent the customer information from being sent to an external network. Thus, any attempt to change the configuration of the sensitive workload to allow the data to be sent to the external network may trigger a violation of the security policy.

Returning to FIG. 3, at step 310 one or more of the systems described herein may enforce, on the proxy, the security policy on the attempt to reconfigure the deployment of the sensitive workload. For example, at step 310 enforcement module 112 may, as part of computing device 202 in FIG. 2, enforce, on computing device 202, security policy 212 on attempt 214 to reconfigure deployment 218 of sensitive workload 208.

Enforcement module 112 may enforce a security policy on any of a variety of types of reconfiguration attempts in any number of ways. For example, enforcement module 112 may disallow an attempt to change a configuration of a deployment of a sensitive workload on a cloud computing platform. Additionally or alternatively, enforcement module 112 may disallow a configuration change to a database tier that would allow the database tier to communicate with an external server.

In some examples, enforcement module 112 may enforce a security policy on an attempt to reconfigure the deployment of a sensitive workload by blocking the attempt. For example, enforcement module 112 may prevent a reconfiguration attempt from moving past a proxy to the network that is to be reconfigured. Enforcement module 112 may also inform a user who instigated the attempted configuration change that the attempted change was blocked and/or may inform a network administrator that the attempted configuration change was blocked.

As explained above in connection with method 300 in FIG. 3, systems described herein may identify a sensitive workload that is hosted on a remote workload hosting platform, which may also be referred to as "the cloud." The sensitive workload may be deployed on a subnet or network segment of a segmented network on the cloud hosting provider. The sensitive workload may be tagged with the type of data included in the sensitive workload, and the tag may include a data loss prevention policy that applies to the sensitive workload.

Systems described herein may identify and/or create a security policy that applies to the sensitive workload. The security policy may include rules defining relationships between the subnet and additional subnets, rules defining how data can be transferred between subnets, and/or rules defining which users may access the sensitive workload. A current deployment of the sensitive workload may comply with the security policy rules, and a proxy may intercept attempts to reconfigure the deployment of the workload that may result in a violation of the security policy rules. The proxy may enforce the security policy by blocking the attempt, thus preventing the reconfiguration of the deployment of the sensitive workload that may have led to a security breach. Enforcing the network segmentation security policy on the proxy may increase the security of sensitive workloads hosted on the cloud, making cloud hosting a more viable solution for securing-conscious enterprises.

Figure 6:
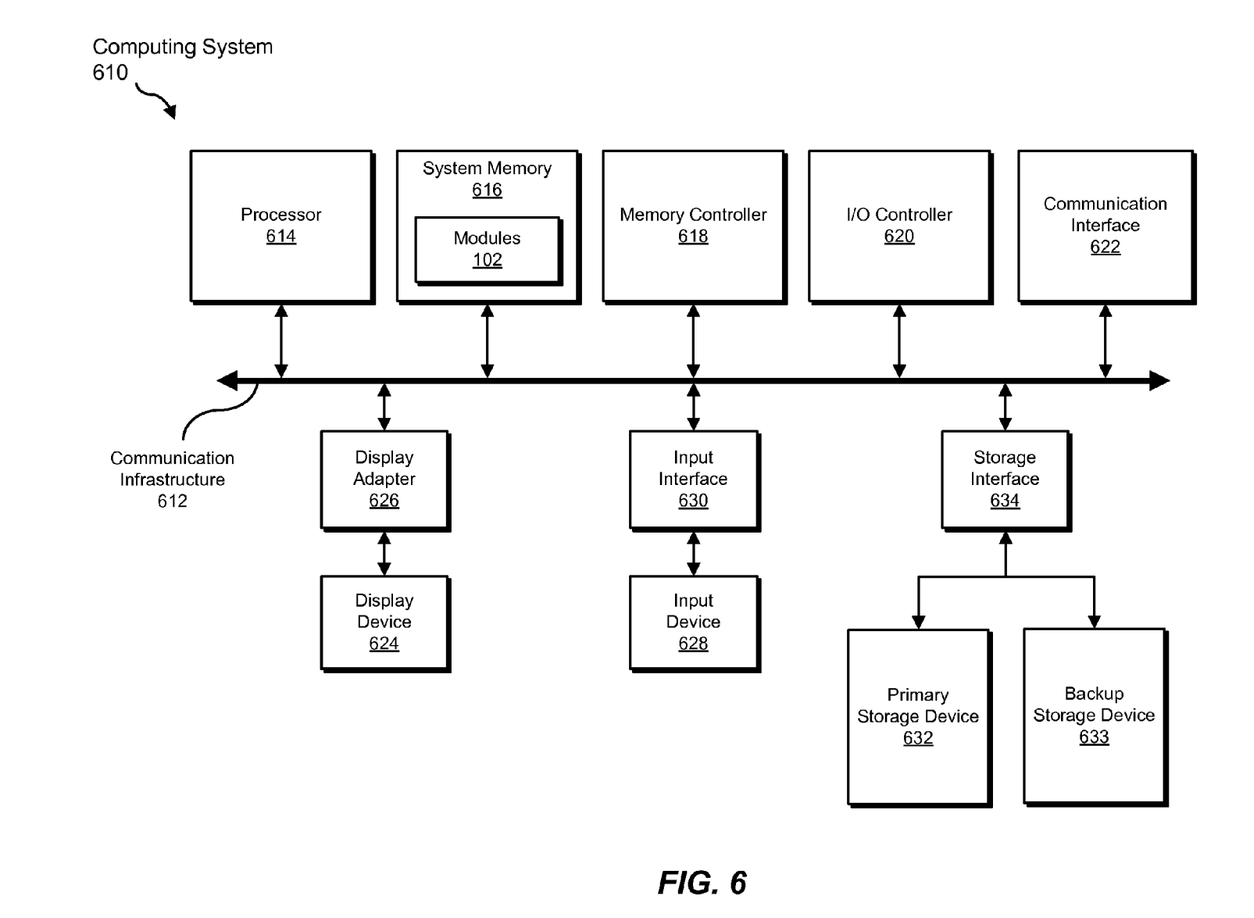
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
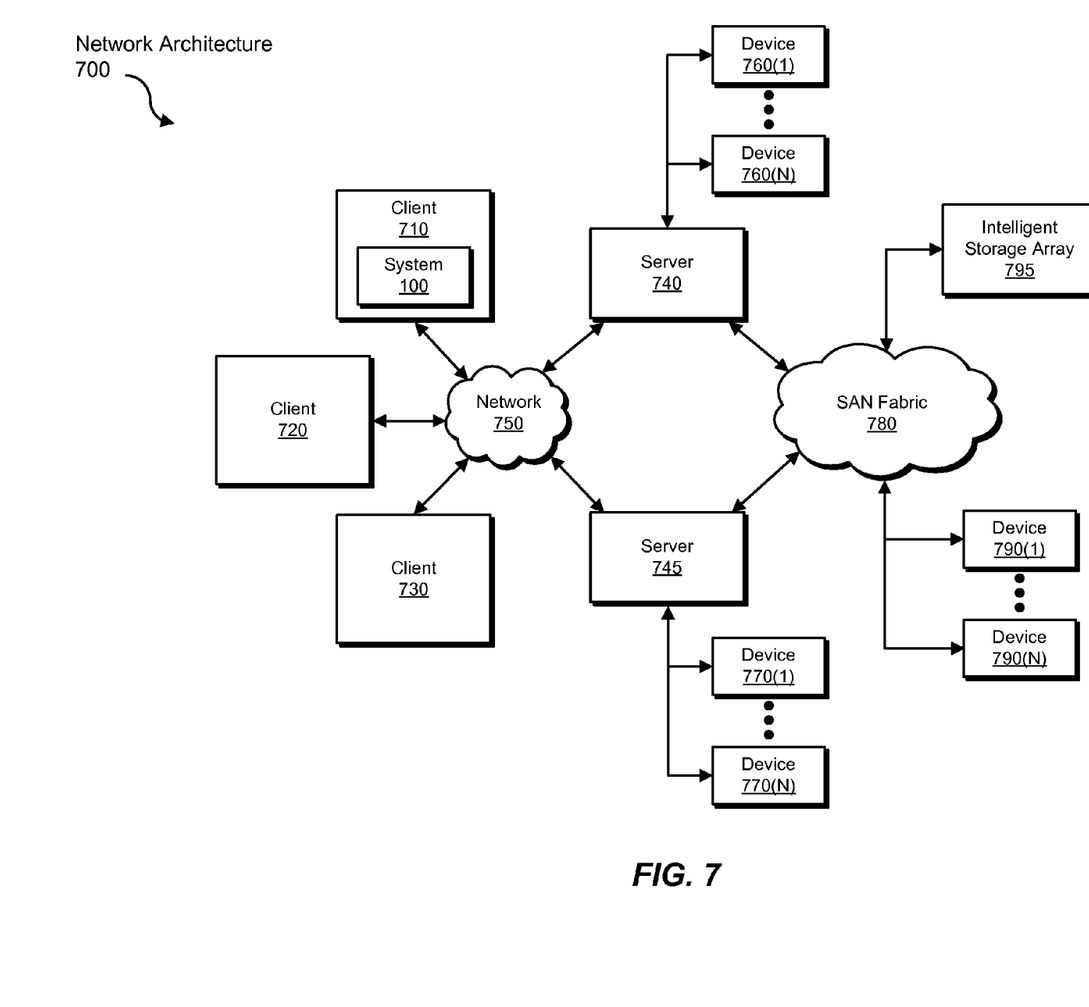
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enforcing secure network segmentation for sensitive workloads.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive sensitive workload data to be transformed, transform the sensitive workload data, output a result of the transformation to a server, use the result of the transformation to determine a security policy, and store the result of the transformation to a proxy. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enforcing secure network segmentation for sensitive workloads, at least a portion of the method being performed by a computing device comprising at least one processor, the method comprising:
   identifying a sensitive workload that is deployed within a subnet of a segmented network that is segmented within a remote workload hosting platform;
   identifying a security policy that applies to the sensitive workload, wherein a deployment of the sensitive workload within the subnet of the segmented network complies with the security policy;
   intercepting, at a proxy outside the segmented network, an attempt from outside the segmented network to reconfigure the deployment of the sensitive workload within the segmented network on the remote workload hosting platform, wherein the attempt to reconfigure the deployment of the sensitive workload comprises an attempt to move the sensitive workload from the subnet to an additional subnet within the segmented network;
   determining that the attempt to reconfigure the deployment of the sensitive workload could result in a violation of the security policy based on a conflict between a configuration of the additional subnet and the security policy that applies to the sensitive workload;
   enforcing, on the proxy, the security policy on the attempt to reconfigure the deployment of the sensitive workload.

2. The computer-implemented method of claim 1, wherein the attempt to reconfigure the deployment of the sensitive workload comprises an attempt to allow data within the sensitive workload to be sent from the subnet to an additional subnet within the segmented network.

3. The computer-implemented method of claim 1, wherein the attempt to reconfigure the deployment of the sensitive workload comprises an attempt to change a relationship between the subnet and an additional subnet within the segmented network, wherein the relationship complies with the security policy and the change to the relationship would allow the violation of the security policy.

4. The computer-implemented method of claim 1, wherein the attempt to reconfigure the deployment of the sensitive workload comprises an attempt to allow a user access to the sensitive workload, wherein the user accessing the sensitive workload comprises the violation of the security policy.

5. The computer-implemented method of claim 1, wherein the attempt to reconfigure the deployment of the sensitive workload comprises an attempt to allow data within the sensitive workload to be sent from the subnet to an external network that is not within the segmented network.

6. The computer-implemented method of claim 1, wherein enforcing the security policy on the attempt to reconfigure the deployment of the sensitive workload comprises blocking the attempt.

7. The computer-implemented method of claim 1, wherein identifying the sensitive workload that is deployed on the subnet comprises identifying a type of the sensitive workload and tagging the sensitive workload with the type.

8. The computer-implemented method of claim 1, wherein the security policy that applies to the sensitive workload is based at least in part on at least one of:
   an owner of the sensitive workload;
   a type of the sensitive workload;
   a tier of the sensitive workload;
   the subnet on which the sensitive workload is deployed;
   a type of data stored by the sensitive workload.

9. A system for enforcing secure network segmentation for sensitive workloads, the system comprising:
- a workload identification module that identifies a sensitive workload that is deployed within a subnet of a segmented network that is segmented within a remote workload hosting platform;
- a policy identification module identifies a security policy that applies to the sensitive workload, wherein a deployment of the sensitive workload within the subnet of the segmented network complies with the security policy;
- an interception module that intercepts, at a proxy outside the segmented network, an attempt to reconfigure the deployment of the sensitive workload within the segmented network on the remote workload hosting platform, wherein the attempt to reconfigure the deployment of the sensitive workload comprises an attempt to move the sensitive workload from the subnet to an additional subnet within the segmented network;
- a determination module that determines that the attempt from outside the segmented network to reconfigure the deployment of the sensitive workload could result in a violation of the security policy based on a conflict between a configuration of the additional subnet and the security policy that applies to the sensitive workload;
- an enforcement module that enforces, on the proxy, the security policy on the attempt to reconfigure the deployment of the sensitive workload;
- at least one processor configured to execute the workload identification module, the policy identification module, the interception module, the determination module, and the enforcement module.

10. The system of claim 9, wherein the attempt to reconfigure the deployment of the sensitive workload comprises an attempt to allow data within the sensitive workload to be sent from the subnet to an additional subnet within the segmented network.

11. The system of claim 9, wherein the attempt to reconfigure the deployment of the sensitive workload comprises an attempt to change a relationship between the subnet and an additional subnet within the segmented network, wherein the relationship complies with the security policy and the change to the relationship would allow the violation of the security policy.

12. The system of claim 9, wherein the attempt to reconfigure the deployment of the sensitive workload comprises an attempt to allow a user access to the sensitive workload, wherein the user accessing the sensitive workload comprises the violation of the security policy.

13. The system of claim 9, wherein the attempt to reconfigure the deployment of the sensitive workload comprises an attempt to allow data within the sensitive workload to be sent from the subnet to an external network that is not within the segmented network.

14. The system of claim 9, wherein the enforcement module enforces the security policy on the attempt to reconfigure the deployment of the sensitive workload by blocking the attempt.

15. The system of claim 9, wherein the workload identification module identifies the sensitive workload that is deployed on the subnet by identifying a type of the sensitive workload and tagging the sensitive workload with the type.

16. The system of claim 9, wherein the security policy that applies to the sensitive workload is based at least in part on at least one of:
- an owner of the sensitive workload;
- a type of the sensitive workload;
- a tier of the sensitive workload;
- the subnet on which the sensitive workload is deployed;
- a type of data stored by the sensitive workload.

17. A non-transitory computer-readable-storage medium comprising one or more computer-readable instructions that, when executed by at least one processor of a computing device, cause the computing device to:
- identify a sensitive workload that is deployed within a subnet of a segmented network that is segmented within a remote workload hosting platform;
- identify a security policy that applies to the sensitive workload, wherein a deployment of the sensitive workload within the subnet of the segmented network complies with the security policy;
- intercept, at a proxy outside the segmented network, an attempt from outside the segmented network to reconfigure the deployment of the sensitive workload within the segmented network on the remote workload hosting platform, wherein the attempt to reconfigure the deployment of the sensitive workload comprises an attempt to move the sensitive workload from the subnet to an additional subnet within the segmented network;
- determine that the attempt to reconfigure the deployment of the sensitive workload could result in a violation of the security policy based on a conflict between a configuration of the additional subnet and the security policy that applies to the sensitive workload;
- enforce, on the proxy, the security policy on the attempt to reconfigure the deployment of the sensitive workload.

18. The non-transitory computer-readable-storage medium of claim 17, wherein the one or more computer-readable instructions cause the computing device to identify the attempt to reconfigure the deployment of the sensitive workload as an attempt to allow data within the sensitive workload to be sent from the subnet to an additional subnet within the segmented network.

19. The non-transitory computer-readable-storage medium of claim 17, wherein the attempt to reconfigure the deployment of the sensitive workload comprises an attempt to change a relationship between the subnet and an additional subnet within the segmented network, wherein the relationship complies with the security policy and the change to the relationship would allow the violation of the security policy.

20. The non-transitory computer-readable-storage medium of claim 17, wherein the attempt to reconfigure the deployment of the sensitive workload comprises an attempt to allow a user access to the sensitive workload, wherein the user accessing the sensitive workload comprises the violation of the security policy.

* * * * *